(12) United States Patent
Suzuki

(10) Patent No.: US 6,607,336 B1
(45) Date of Patent: Aug. 19, 2003

(54) SUCTION TABLE APPARATUS FOR A NUMERICAL CONTROL MACHINE

(75) Inventor: Yukitomo Suzuki, Hamamatsu (JP)

(73) Assignee: Heian Corporation, Shizuoka-ken (JP)

( * ) Notice: Subject to any disclaimer, the term of this patent is extended or adjusted under 35 U.S.C. 154(b) by 240 days.

(21) Appl. No.: 09/616,269

(22) Filed: Jul. 14, 2000

(30) Foreign Application Priority Data

Oct. 5, 1999 (JP) .......................................... 11-283817

(51) Int. Cl.$^7$ .............................. B23Q 1/25; B25B 11/00
(52) U.S. Cl. ........................ 409/163; 269/21; 269/266; 269/304; 408/76; 409/197; 409/218; 409/225
(58) Field of Search .......................... 144/286.5, 287; 408/76, 91; 409/163, 197, 218, 227, 225, 903; 269/21, 266, 303, 304

(56) References Cited

U.S. PATENT DOCUMENTS

| 4,088,312 A | * | 5/1978 | Frosch et al. ................. 269/21 |
| 4,640,501 A | * | 2/1987 | Poland .......................... 269/21 |
| 4,684,113 A | * | 8/1987 | Douglas et al. ................ 269/21 |
| 4,723,766 A | * | 2/1988 | Beeding ........................ 269/21 |
| 4,838,531 A | * | 6/1989 | Corsi ............................ 269/21 |
| 5,249,785 A | * | 10/1993 | Nelson et al. ................. 269/21 |
| 5,996,656 A | * | 12/1999 | Fezer ....................... 144/162.1 |
| 6,386,805 B1 | * | 5/2002 | Suzuki .......................... 269/21 |

FOREIGN PATENT DOCUMENTS

| FR | 246363 A | * | 4/1981 | ................... 269/21 |
| JP | 144925 A | * | 6/1988 | ................... 269/21 |
| JP | 253779 A | * | 10/1993 | ................... 269/21 |

* cited by examiner

Primary Examiner—Daniel W. Howell
(74) Attorney, Agent, or Firm—Richard M. Goldberg

(57) ABSTRACT

Long support members are mounted on a table and are moved in the direction of a width of the table, rule stopper frames are moved and pad frames are fixed on long support members, or rule stopper frames are fixed and pad frames are moved on long support members, and the long support members are moved according to the length and width of a process board.

8 Claims, 11 Drawing Sheets

SUCTION TABLE APPARATUS FOR A NUMERICAL CONTROL MACHINE

BACKGROUND OF THE INVENTION

Apparatus for a numerical control machine having plural moving frames on which one stopper and plural suction pads are respectively mounted and a process board is surely positioned on the suction pads.

In a prior art, there is provided a numerical control router in which the ahead structure having plural heads is moved by a servomotor along rails attached to a front side of a cross beam on the upper portion of a base member, plural, movement frames are respectively moved and positioned by a servomotor in parallel on at table frame, plural, movement pad frames are mounted to move on the movement frames respectively, by a servomotor; suction pads are respectively mounted on the movement pad frames to move up and down by cylinders, whereby the movement frames and the movement pad frames are positioned in predetermined spaces, respectively.

However, in the numerical control machine, when a wide process board is positioned on the suction pads on the table frame to be processed, the movement frames are moved and positioned on the table frame in the same spaces; the pad frames are moved and positioned on the movement frames in the same spaces respectively. Therefore, after one process board is processed, when the next process board of the a different width or length is processed, the time for moving the movement frames and pad frames becomes long, because the process board cannot to be held by suction in the most suitable condition. Therefore the working time for positioning the process board becomes long.

It is, therefore, the primary object of the present invention to provide a suction table apparatus for a numerical control machine in which rule stopper frames are respectively mounted to move on sides of plural long support frames and pad frames are respectively fixed on the plural moving frames, whereby process boards can be easily positioned and to be held by the suction pads.

It is, another object of the present invention to provide a suction table apparatus for a numerical control machine in which rule stopper frames are fixed on the sides of plural long support frames and pad frames are respectively mounted to move on the plural moving frames, whereby process boards can be simply positioned and to be held by suction on the suction pad.

In order to accomplish the above and other objects, the present invention comprises a plurality of long support members mounted to be moved to a width wise direction of a table, rule stopper frames mounted to be moved along the long support members respectively near one end thereof, rule stoppers respectively attached to up and down cylinders mounted on the rule stopper frames respectively, a moving apparatus having a servomotor for moving the rule stopper frames, pad frames fixed in a predetermine special relation to the rule stopper frames on each of the long support members, and suction pads respectively attached to up and down cylinders mounted on each of the pad frames.

Figure 1:
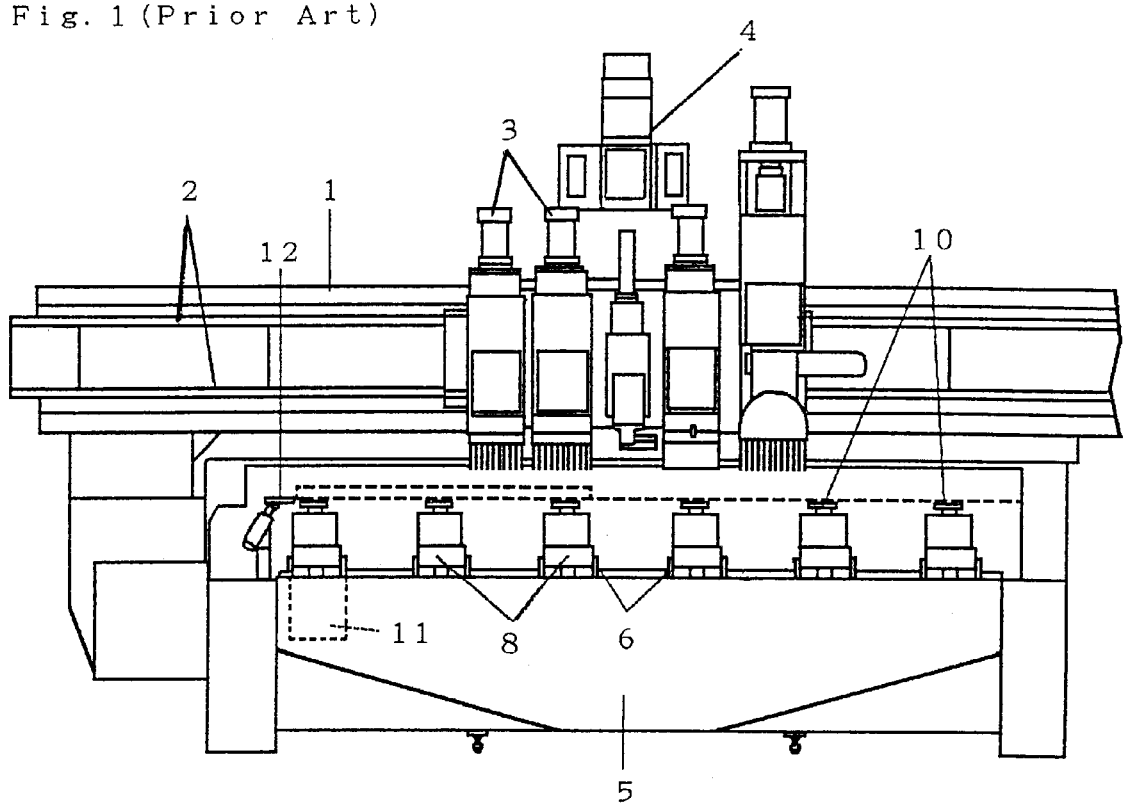
FIG. 1 shows a front elevational view of a numerical control machine provided by the applicant.
Figure 2:
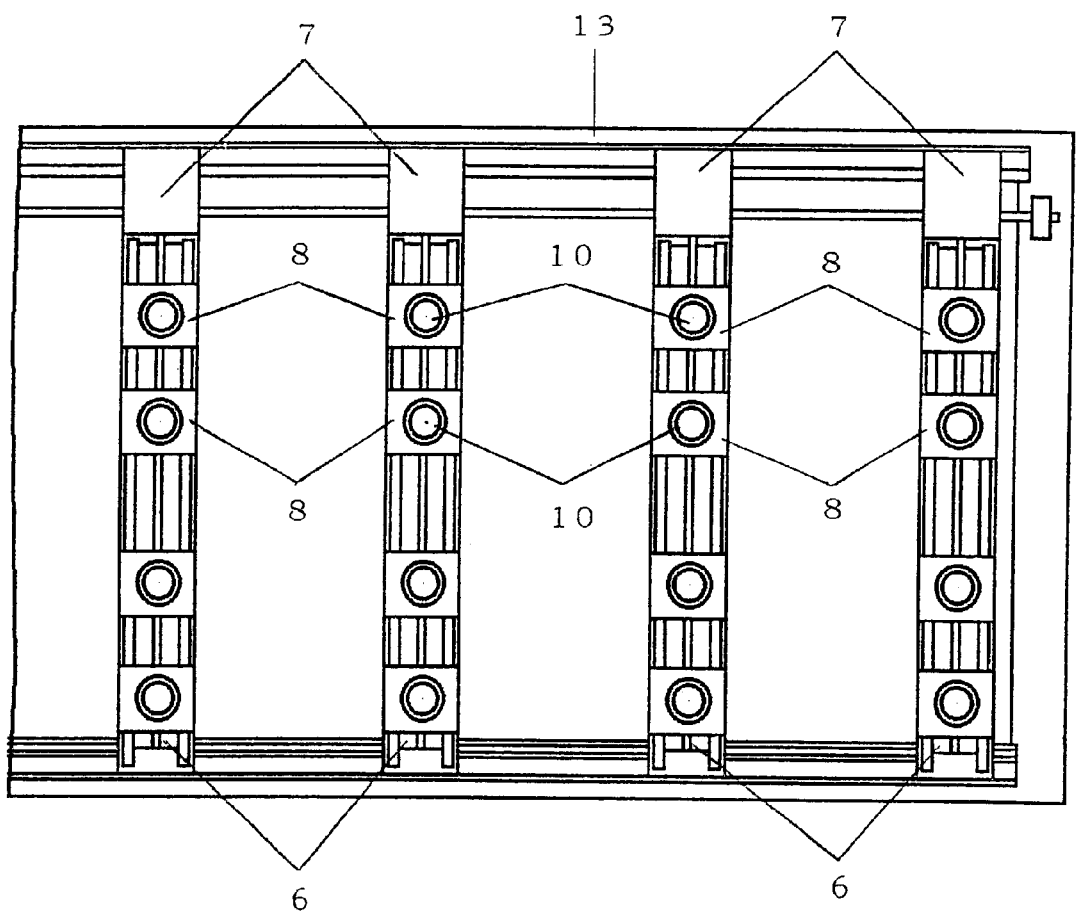
FIG. 2 shows a top plan view of a suction table of the numerical control machine in FIG. 1.

The applicant has provided a numerical control machine (see Japanese Patent Opening No. 6-43044) shown in FIGS. 1 and 2 in which a head structure 4 having plural heads 3 is moved by a servomotor along rails 2 attached to the front of a base frame 1, a table 5 is moved by a servomotor cross the moving direction of the head structure 4, plural moving racks 6 are mounted in parallel to be moved on the table 5, plural moving pad racks 8 are mounted to be moved on the moving racks respectively, plural suction pads 10 are attached to plural up and down cylinders mounted on the moving pad racks 8, respectively, and the moving racks 8 are respectively positioned by servomotors 11, whereby the spaces between the moving racks 6 and the moving pad racks 8 are regulated in the predetermined values. Also, rule stoppers 12 and 13 are provided with the end of the table 5.

Figure 3:
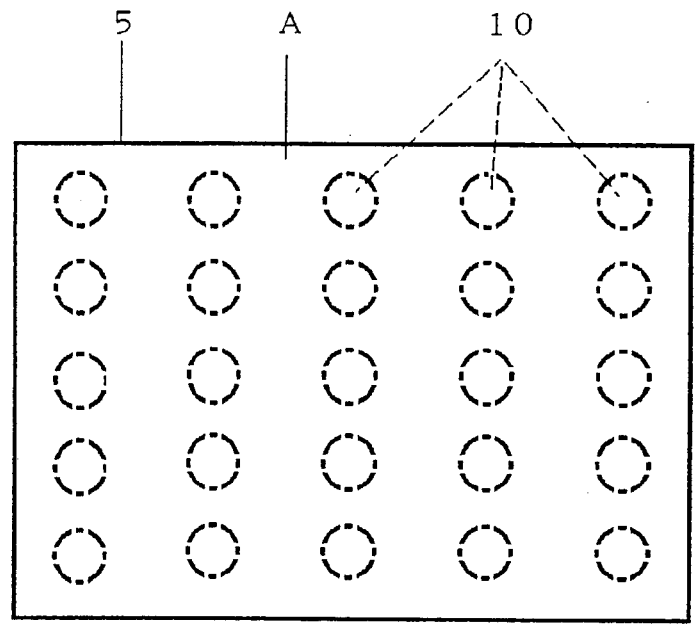
FIG. 3 shows a plan view of the suction table of FIG. 1 on which a large process board is held by suction.
Figure 4:
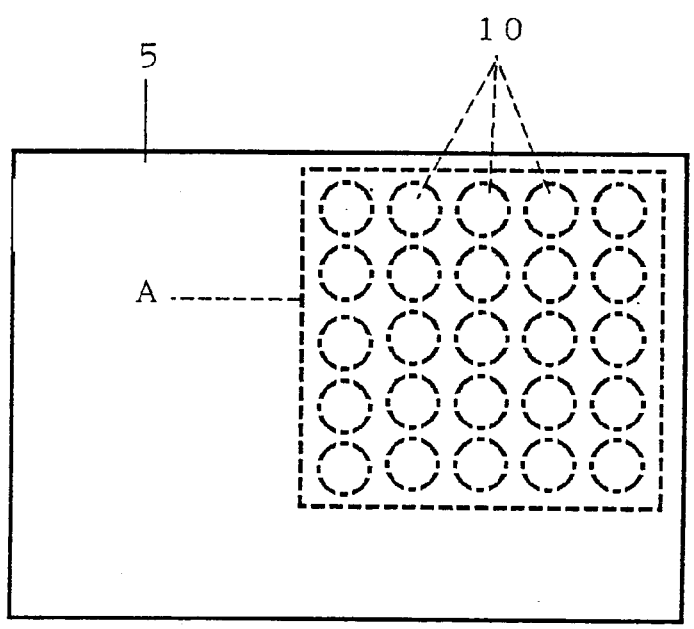
FIG. 4 shows a plane view of the suction table on which a small process board is sucked in FIG. 1.

However, in the numerical control machine, when a large process board A is processed, the suction pads 10 are moved by the same wide spaces as shown in FIG. 3, and when a small process board A is processed, the suction pads are moved by the same narrow spaces. Therefore, when the different process boards are processed in turn, a long time is necessary for, moving the suction pads 10 such that, the process board is held by suction by the suction pads 10 under the optimum conditions consequently the time for processing becomes long.

Figure 5:
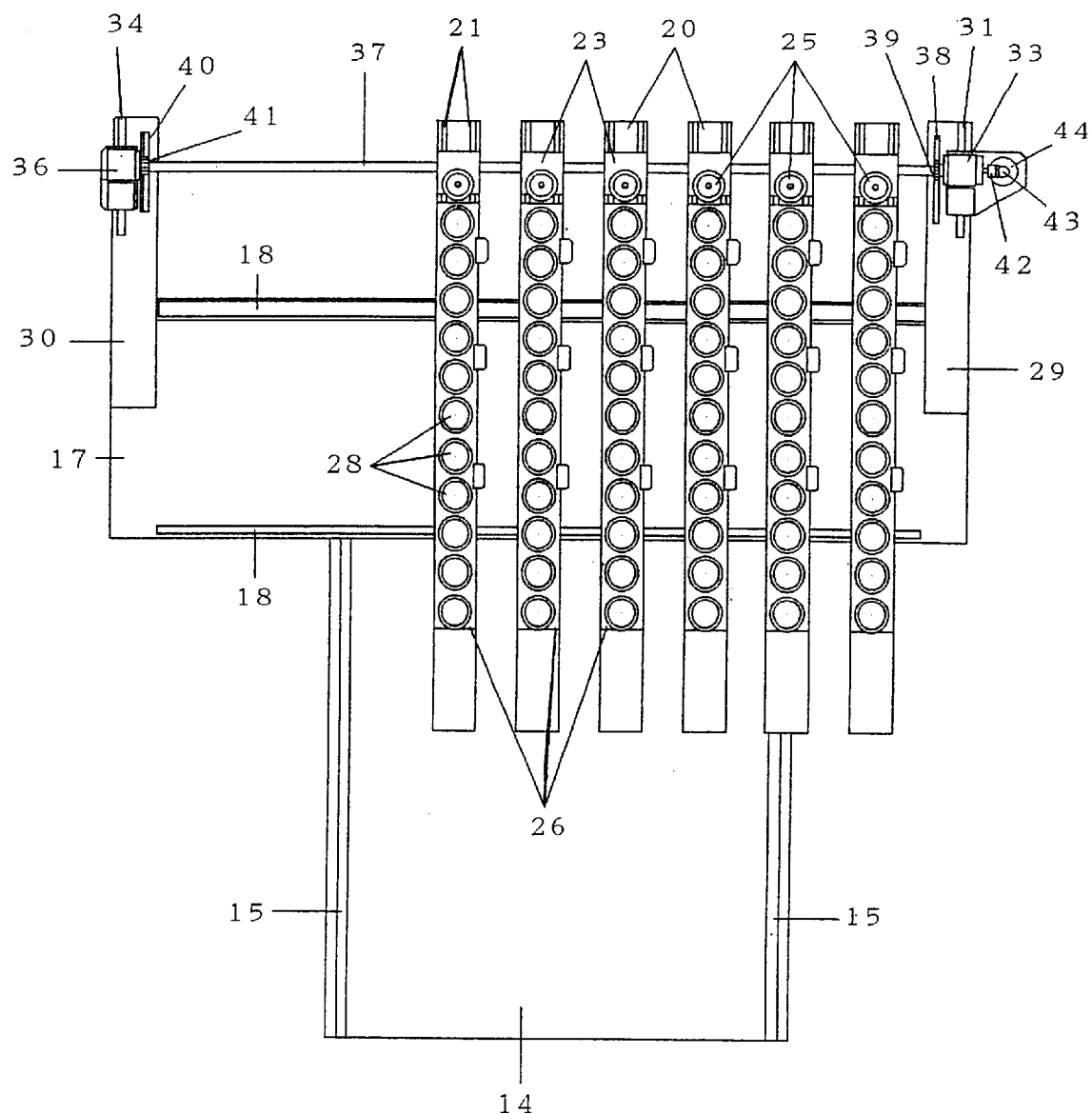
FIG. 5 shows a top plan view of a suction table of FIG. 1 apparatus for a numerical control machine in the embodiment of the present invention.
Figure 6:
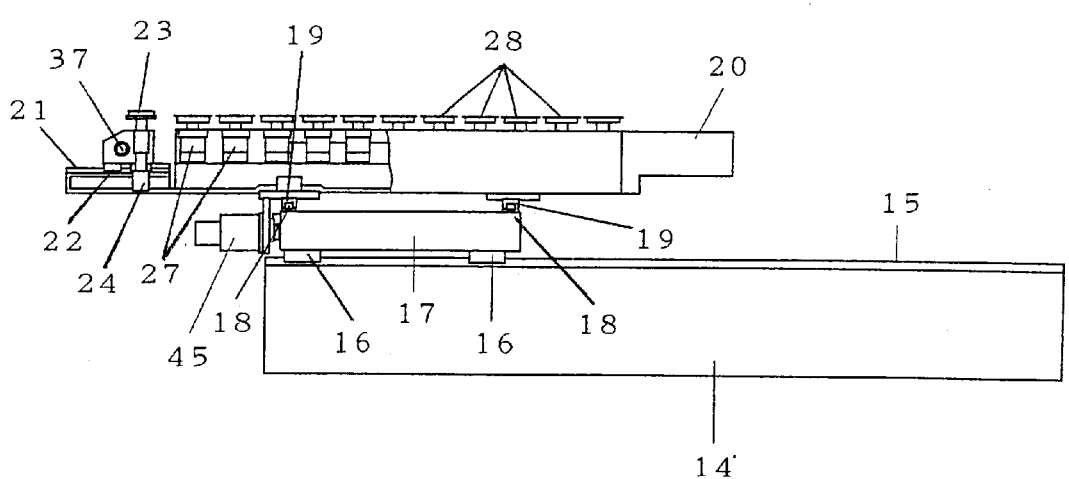
FIG. 6 shows a side view of the suction table apparatus for a numerical control machine in FIG. 5.
Figure 7:
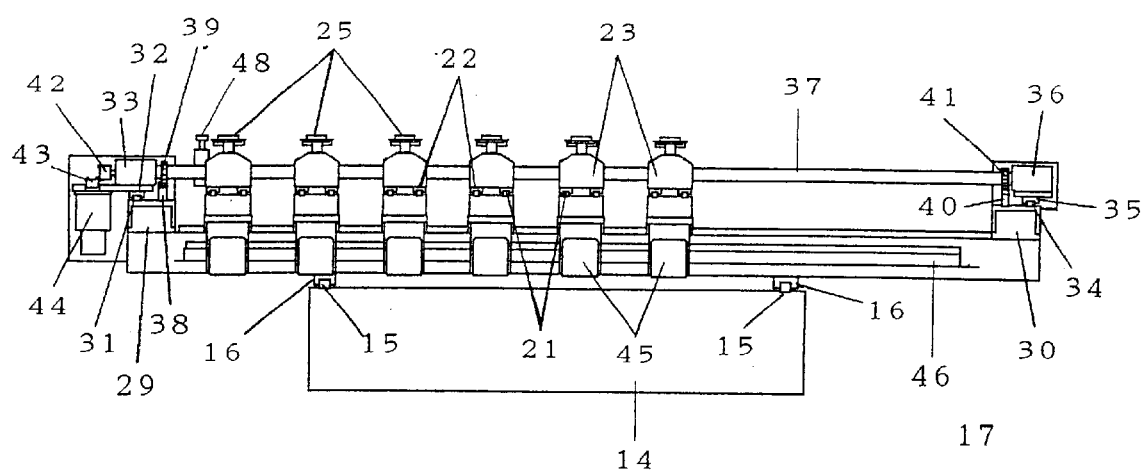
FIG. 7 shows a rear view of the suction table apparatus in FIG. 5.

Referring to FIGS. 5, 6 and 7 there is shown an embodiment of the present invention in which, rails 15 are mounted on a base 14 and, bearings 16 engaged with the rails 15 are attached to the lowers part of a table 17. Also, rails 18 are mounted on the table 17 and, bearings 19 engaged with the rails 18 are attached to the lower parts of plural long support members 20 respectively. Rails 21 are respectively mounted on one end of the long support members 20, bearings 22 engaged with the rails 21 are respectively attached to rule stopper frames 23 and, up and down cylinders 24 attaching rule stoppers 25 are mounted on the rule stopper frames 23.

Pad frames 26 are mounted near the rule stopper members 23 on, the long support members 20 respectively, a plurality of up and down cylinders 27 are respectively mounted on the pad frames 26, and suction pads 28 are respectively attached to the moving shafts of the up and down cylinders 27.

Fix stages 29 and 30 are fixed on both ends of the table 17, A bearing 32 is engaged with a rail 31 mounted on the fix stage 29 and is attached to a plumber block 33, a bearing is engaged with a rail 34 mounted on the fix stage 30 and is attached to a plumber block 36, the both ends of a rotary shaft 37 are supported by the plumber blocks 33 and 36, and the rotary shaft 37 is penetrates the holes of the rule stopper members 23 mounted on the long support members 20.

A rack 38 is mounted on the fix stage 29 in parallel with the rail 31 and is engaged with a pinion 39 attached to the rotary shaft 37, and a rack 40 is mounted on the fix stage 30 in parallel with the rail 34 and is engaged with a pinion 41 attached to the rotary shaft 37.

A bevel gear 42 fixed at one end of the rotary shaft 37 is engaged with a bevel gear 43 of a rule stopper moving servomotor 44 fixed to the fix stage 29. Support member moving servomotors 45 for moving the long support members 20 are provided with one end of the long support members 20 and, pinions (not shown) fixed to the rotary shafts of the support member moving servomotors 45 are engaged with a rack 46 mounted on the table 17, the long support members 20 are thereby respectively moved by the support member moving servomotors 45. The table 17 is moved by a servomotor (not shown) provided with the base 14.

Figure 8:
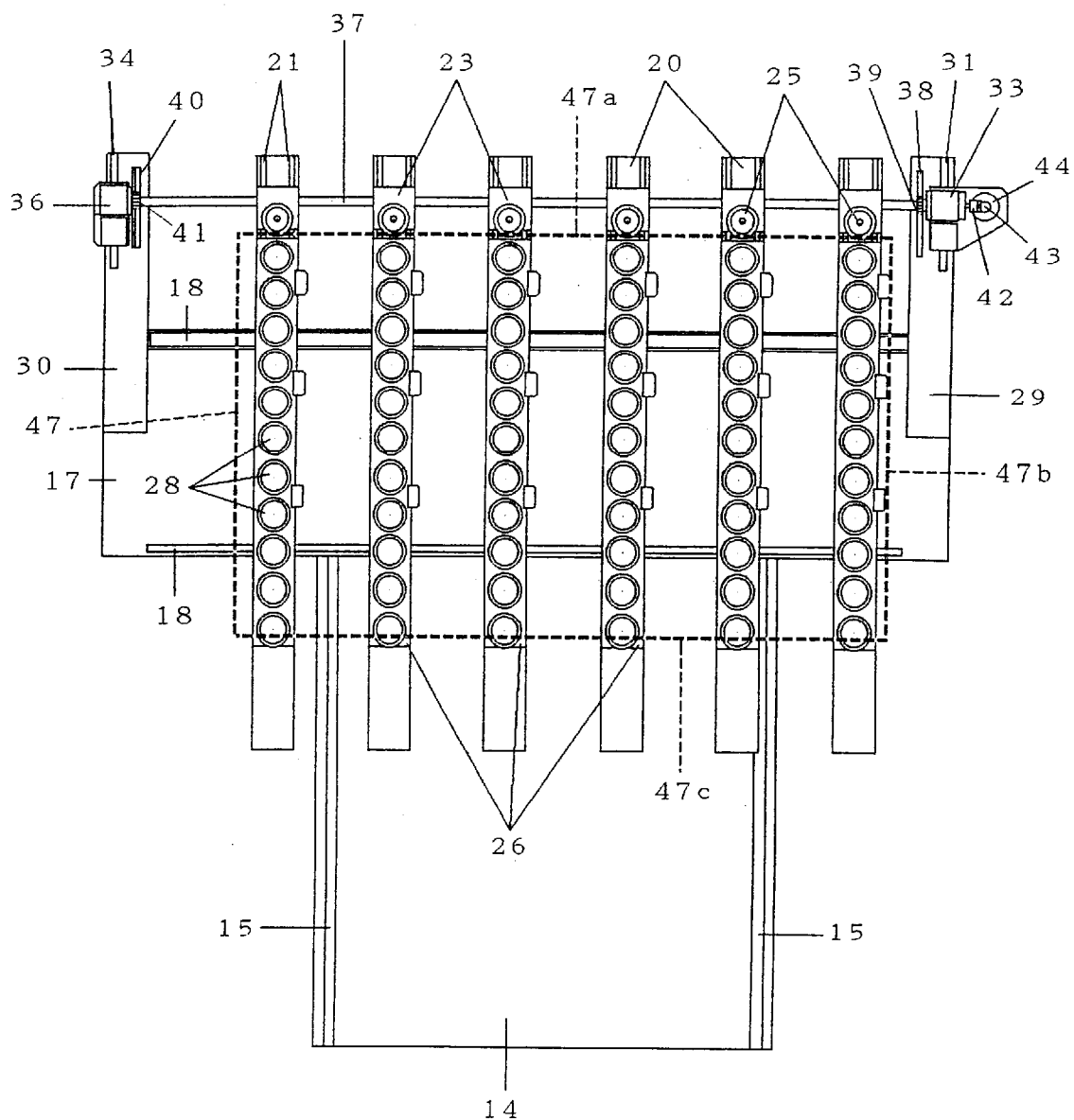
FIG. 8 shows a view on which a large process board is mounted on a suction table apparatus in FIG. 3.

In the suction table apparatus in the present embodiment, as shown in FIG. 8, when the large process board 47 is held by suction on the suction pads 28, the long support members 20 are so moved and positioned that the spaces between the long support members 20 become the same by the support member moving servomotors 45. Then the rule stoppers 25 are raised by the up and down cylinders 24, and the process board 47 is held by suction on the suction pads 28 such that one edge 47a contacts with the rule stoppers 25 and the edge 47b adjoining the one edge 47a contacts with rule stoppers 48. If the other edge, 47c opposite to the one edge 47 is positioned on the middle portions of the suction pads 28 at one end of the long support members 20, the rotary shaft 37 is rotated by the rotation of the rule stopper moving servomotor 44 so that the rule stopper frames 23 are moved along the long support member 20, and the rule stoppers 25 are so moved that the other edge 47c of the process board 47 passes through the suction pads 28 at the one end of the long support members 20. Then the suction pads 28 are by the up and down cylinders 27, the process board 47 is fixed in position by the suction pads 28 and the rule stoppers 25 are lowered by the up whereby down cylinders 24 and the process board 47 can be processed by the numerical control machine.

Figure 9:
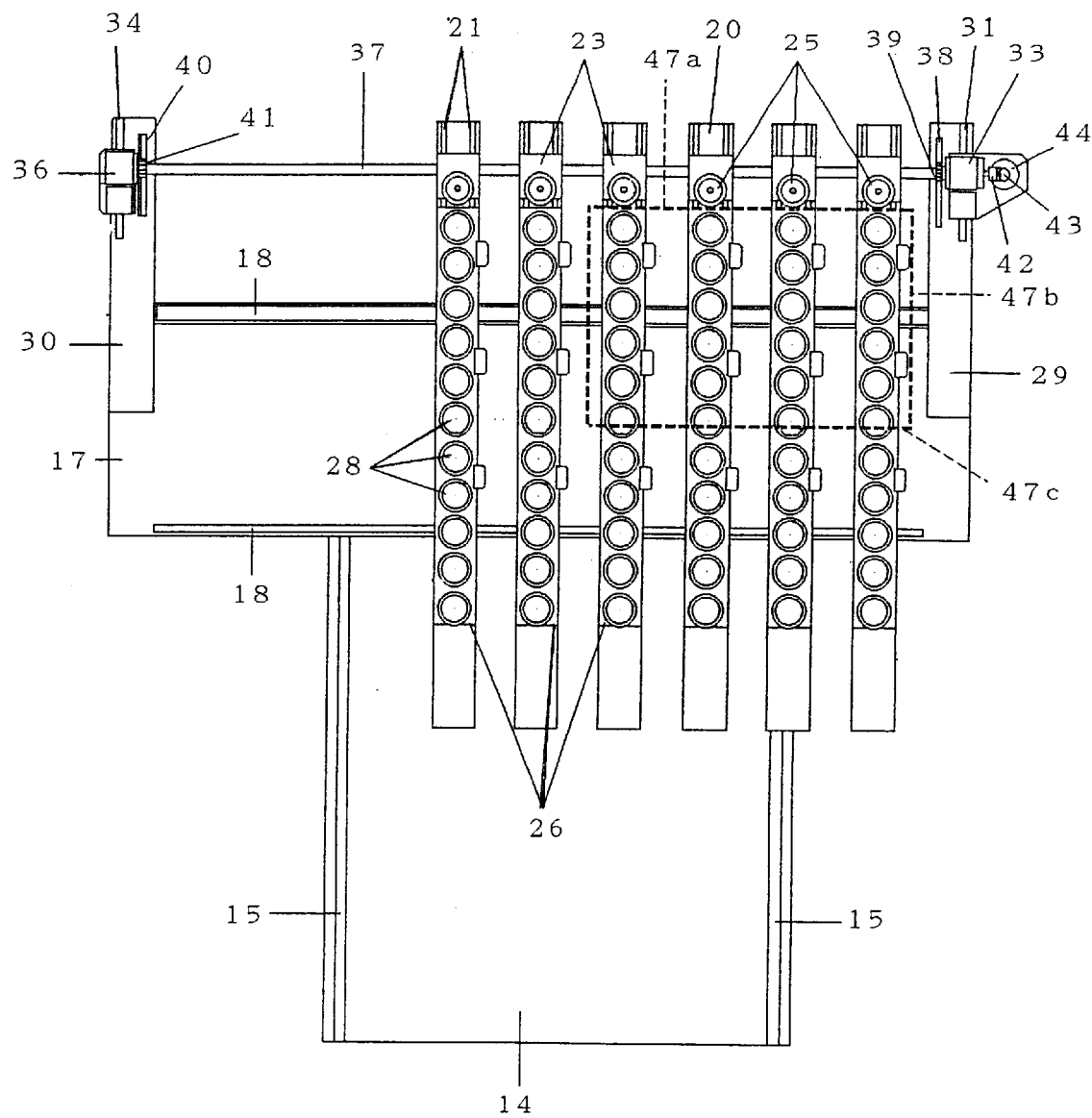
FIG. 9 shows a view on which a small process board is mounted on a suction table apparatus in FIG. 1.

As shown in FIG. 9, when the process board 47 is small, some long support members 20 are used, one edge 47a of the process board 47 contacts the rule stoppers 25 and the edge 47b adjoining the one edge 47a contacts rule stoppers 48. If the other edge 47c opposite to the one edge 47a is positioned in the middle of each of the suction pads 28 in the long support members 20, the rotary shaft 37 is rotated by the rotation of the rule stopper moving servomotor 44 so that the rule stopper frames 23 are moved on the long support members 20 respectively, and the rule stoppers 25 are so moved that the other edge 47c of the process board 47 traverses each of the suction pads 28 at the one end of the long support members 20. Then the suction pads 28 are raised by the up and down cylinders 27, the process board 47 is fixed in position by the suction pads 28 and, the rule stoppers 25 are lowered by the up and down cylinders 24 and the process board 47 is processed by the numerical control machine.

In the present embodiment, because the rule stopper frames 23 and the pad frames 26 are mounted on the plural long support members 20, the motion of the long support members 20 becomes small, the different process boards 47 optimally held by suction on the suction pads 28 and the efficiency of the work is improved.

Figure 10:
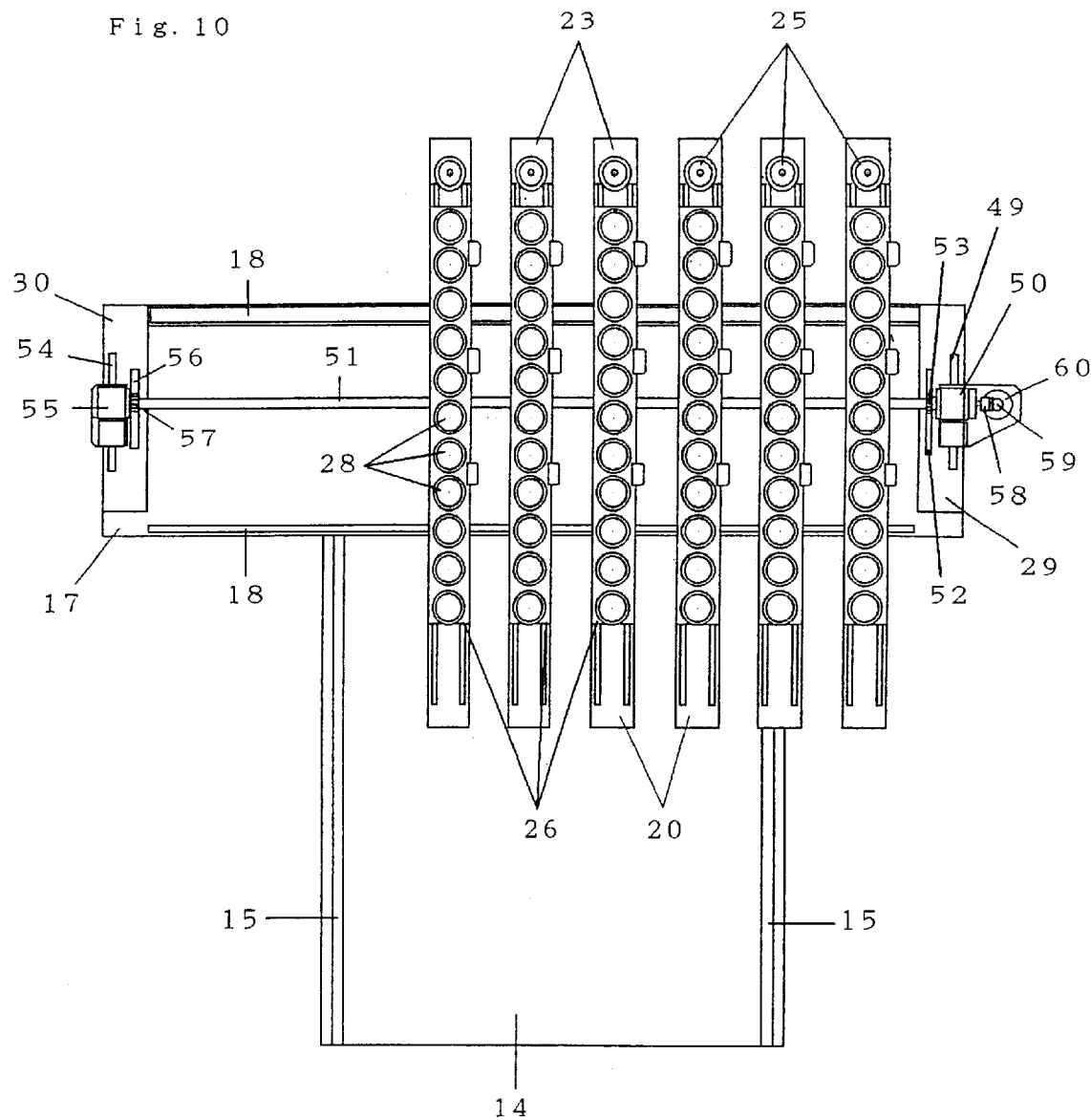
FIG. 10 shows a top plan view of a suction table apparatus for a numerical control machine according to another embodiment of the present invention.

Referring to FIG. 10, 15 designates a base, 15; rails, a table 17, rails 18, long support members 20, rule stopper frames 23, rule stoppers 25, fix stages 29 and 30, and a detailed explanation of these elements is omitted because these elements are the same as the above embodiment. In this embodiment, the rule stopper frames 23 are fixed at one end of the long support members 20, the pad frames 26 are respectively mounted to move on the long support members 20a, rail 49 is fixed to the fix stage 29, a bearing (not shown) engaged with rail 49 is attached to a plumber block 50, one end of a rotary shaft 51 is supported to rotate by the plumber block 50, a rack 52 is fixed to the fix stage 29 in parallel with the rail 49, and a pinion 53 fixed to the rotary shaft 51 is engaged with the rack 52.

A rail 54 is fixed the fix stage 30, a bearing (not shown) engaged with rail 54 is attached to plumber block 55, the other end of a rotary shaft 51 is supported to rotate by the plumber block 55, a rack 56 is fixed to the fix stage 30 in parallel with the rail 54, and a pinion 57 fixed to the rotary shaft 51 engaged with the rack 56, the rotary shaft 51 penetrates the holes of the pad frames 26 of the long support member 20. A bevel 58 fixed to the one end of the rotary shaft 51 is engaged with a bevel gear 59 of a pad frame moving servomotor 60.

In the embodiment, when one edge of the process board 47 is contacts the rule stoppers 25 and is positioned on the long support members 20, if the other opposite edge 47c of the process board 47 is positioned at the middle of each of the suction pads 28, the pad frames 26 are moved by the pad frame moving servomotor 60, so that the other opposite edge 47c of the process board 47 traverses, the suction pads 28, and the process board is positioned and held by sucking the suction pads 28.

In the embodiment, because the long support members 20 are moved in the direction of the width of the table 17, the rule stopper frames 23 are fixed on the one edge of the long support members 20, and the pad frames 26 are moved on the long support members 20, the process board 47 is so positioned on the pad frames 26 that the other edges of the process board 47 are not positioned at the middle of the suction pads 28. Accordingly the different process boards 47 are optimally held by suction on the fixed suction pads 28 and the efficiency of the work is improved.

Figure 11:
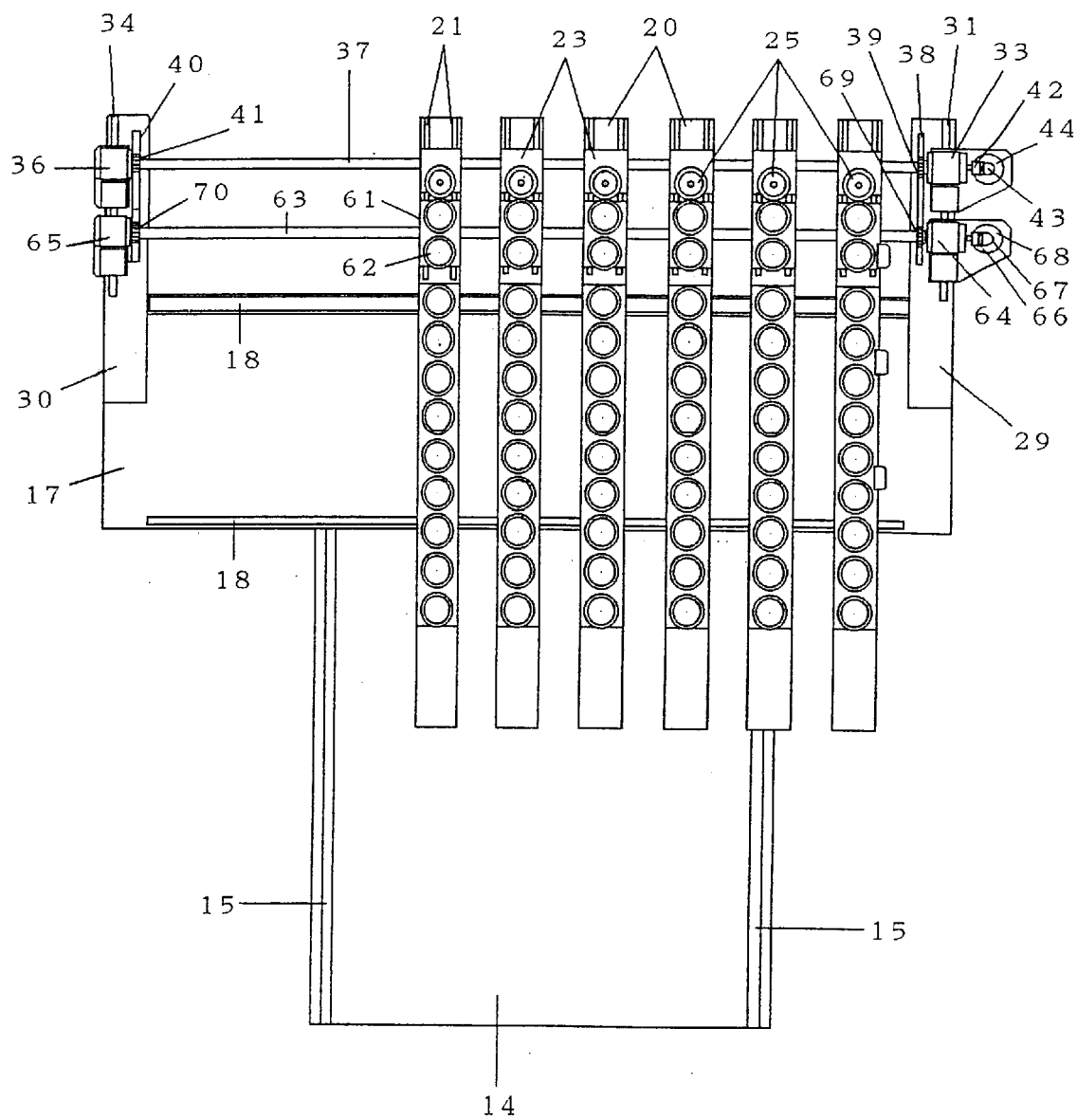
FIG. 11 shows a top plan view of a suction table apparatus for a numerical control machine according to another embodiment of the present invention.
Figure 12:
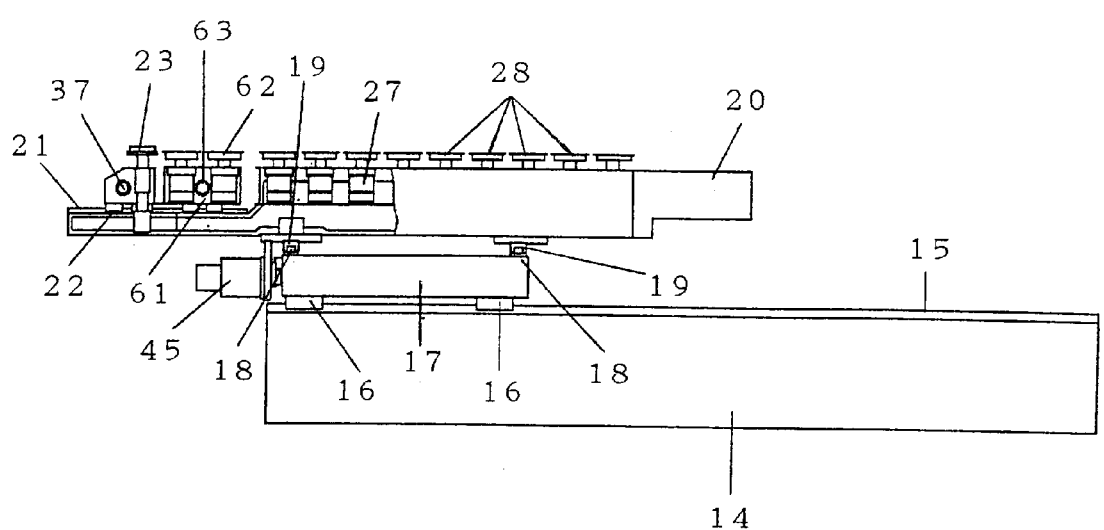
FIG. 12 shows a side elevational view of a suction table apparatus for a numerical control machine according to the embodiment of FIG. 11 of the present invention.

Referring to FIGS. 11 and 12, there is shown another embodiment of the invention which includes a base 14, rails 15, a table 17, rails 18, long support members 20, rails 21, rule stopper frames 23, rule stoppers 25, pad frames 26, fix stages 29 and 30, a rail 31, a plumber block 33, a rail 34, a plumber block 36, a rotary shaft 37, a rack 38, a pinion 39, a rack 40, a pinion 41, bevel gears 42 and 431 and a stopper moving servomotor 44, and the explanation of these elements is omitted because they are the same as in the recent above embodiment. In the embodiment, moving pad frames 61 are mounted on the long support members 20 between the rule stopper frames 23 and the pad frames 26, and moving suction pads 62 respectively are attached to moving shafts of up and down cylinders (not shown) mounted on the moving pad frames 61.

A rotary shaft 63 is penetrates holes of the moving pad frames 61, opposite ends of the rotary shaft 63 are supported by plumber blocks 64 and 65, and bearings respectively attached to the plumber blocks 64 and 65 are respectively engaged with the rails 31 and 34 which are mounted on the fix stages 29 and 30 respectively. A bevel gear 66 fixed at the end of the rotary shaft 63 is engaged with a bevel gear 67 of a moving pad servomotor 68; pinions 69 and 70 fixed at the rotary shaft 63 are engaged with the racks 38 and 40 respectively, mounted on the fix stages 29 and 30, whereby the moving pad frames 61 are moved by the moving pad servomotor 68 between the rule stopper frames 23 and the fix pad frames 26 and the spaces between the rule stopper frames 23 and the fix pad frames 26 are optimally regulated.

In FIG. 11, when the rule stopper frames 23 are fixed and the pad frames 26 are moved on the long support members 20, the moving pad frames 61 may be moved.

What is claimed is:

1. A suction table apparatus for a numerical control machine, comprising:

plurality of long support members mounted to be moved in a widthwise direction of a table, rule stopper frames mounted to be moved along the long support members, respectively, near one end thereof, first up and down cylinders mounted on the rule stopper frames, respectively, rule stoppers respectively attached to the up and down cylinder, a rule stopper moving apparatus having a servomotor for moving the rule stopper frames, pad frames fixed in a predetermined spatial relation to the rule stopper frames on each of the long support members, and second up and down cylinders mounted on each of the pad frames, and a suction pad respectively attached to each second up and down cylinder.

2. A suction table apparatus for a numerical control machine as set forth in claim 1 wherein said rule stopper moving apparatus having the servomotor comprises:

a rotary shaft which penetrates holes in the rule stopper frames, plumber blocks supporting both ends of the shaft, said plumber blocks being mounted on fixed stages, a pinion fixed to the rotary shaft, a rack fixed on one fixed stage and engaged with the pinion, and a rule stopper moving servomotor connected with the rotary shaft.

3. A suction table apparatus for a numerical control machine as set forth in claim 1 further comprising moving apparatus for moving the long support members, said moving apparatus comprising:

servomotors mounted on the long support members, respectively, a rack mounted on the table, and pinions respectively fixed to shafts of the servomotors, said pinions being engaged with said rack.

4. A suction table apparatus for a numerical control machine as set forth in claim 1 further comprising other pad frames mounted to move between the rule stopper frames and the pad frames on the long support members, respectively.

5. A suction table apparatus for a numerical control machine, comprising:

a plurality ;of long support members mounted to be moved in a widthwise direction of a table, rule stopper frames fixed to one end of the long support members, respectively, first up and down cylinders mounted on the rule stopper frames, respectively, rule stoppers respectively attached to the up and down cylinder, pad frames mounted to move on the long support members, respectively, and second up and down cylinders mounted on each of the pad frames, a suction pad respectively attached to each second up and down cylinder, and a pad frame moving apparatus having a servomotor for moving the pad frames.

6. A suction table apparatus for a numerical control machine as set forth in claim 5 wherein said pad frame moving apparatus comprises:

a rotary shaft which penetrates holes in the pad frames, plumber blocks supporting both ends of the shaft, said plumber blocks being mounted on fixed stages, a pinion fixed to the rotary shaft, a rack fixed on one fixed stage and engaged with the pinion, and a rule stopper moving servomotor connected with the rotary shaft.

7. A suction table apparatus for a numerical control machine as set forth in claim 5 further comprising moving apparatus for moving the long support members, said moving apparatus comprising:

servomotors mounted on the long support members, respectively, a rack mounted on the table, and pinions fixed to shafts of the servomotors, the pinions being engaged with said rack.

8. A suction table apparatus for a numerical control machine as set forth in claim 5 further comprising other pad frames mounted to move between the rule stopper frames and the pad frames on the long support members, respectively.

* * * * *